US010243399B2

(12) United States Patent
Jung

(10) Patent No.: US 10,243,399 B2
(45) Date of Patent: Mar. 26, 2019

(54) WIRELESS POWER TRANSMISSION APPARATUS INSTALLABLE ON WALL

(71) Applicant: GE HYBRID TECHNOLOGIES, LLC, Niskayuna, NY (US)

(72) Inventor: Chun-Kil Jung, Seoul (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 169 days.

(21) Appl. No.: 15/104,744

(22) PCT Filed: Nov. 28, 2014

(86) PCT No.: PCT/KR2014/011568
§ 371 (c)(1),
(2) Date: Sep. 22, 2016

(87) PCT Pub. No.: WO2015/093748
PCT Pub. Date: Jun. 25, 2015

(65) Prior Publication Data
US 2017/0005518 A1    Jan. 5, 2017

(30) Foreign Application Priority Data

Dec. 16, 2013  (KR) .......................... 10-2013-0156720

(51) Int. Cl.
*H02J 50/10* (2016.01)
*H02J 50/60* (2016.01)
(Continued)

(52) U.S. Cl.
CPC .............. *H02J 50/10* (2016.02); *H02J 5/005* (2013.01); *H02J 7/0044* (2013.01); *H02J 7/025* (2013.01);
(Continued)

(58) Field of Classification Search
CPC .. H02J 5/005; H02J 7/025; H02J 17/00; H02J 7/00; H02J 7/02; H01F 38/14;
(Continued)

(56) References Cited

U.S. PATENT DOCUMENTS 9,300,082 B2 *   3/2016  Underwood ....... H01R 13/6205
2002/0171396 A1 * 11/2002  Pettinato ............... H02J 7/0044
                                                                   320/111

(Continued)

FOREIGN PATENT DOCUMENTS

| JP | 2013-70520 A | 4/2013 |
|----|----|----|
| KR | 10-2010-0005698 A | 1/2010 |
| KR | 10-2012-0048311 A | 5/2012 |

OTHER PUBLICATIONS

International Search Report dated Feb. 27, 2016, issued to International Application No. PCT/KR2014/011568.

*Primary Examiner* — Rexford Barnie
*Assistant Examiner* — Terrence Willoughby
(74) *Attorney, Agent, or Firm* — DeLizio Law, PLLC

(57) ABSTRACT

The present invention provides a wireless power transmission apparatus installable on a wall, the wireless power transmission apparatus comprising: a housing configured to allow a wireless power reception apparatus to be placed thereon; a plug, a part of which is embedded in the housing, the plug being configured to be coupled with a socket for alternating current power installed on a wall; and a transmission unit which is embedded in the housing, converts an alternating current power supplied from the plug to a direct current power, and outputs a wireless power signal to the wireless power reception apparatus.

14 Claims, 5 Drawing Sheets

(51) Int. Cl.
  *H02J 50/90*  (2016.01)
  *H02J 7/00*  (2006.01)
  *H02J 7/02*  (2016.01)
  *H02J 50/40*  (2016.01)
  *H02J 50/12*  (2016.01)
  *H02J 50/80*  (2016.01)
  *H02J 50/70*  (2016.01)
  *H02J 5/00*  (2016.01)

(52) U.S. Cl.
  CPC .............. *H02J 50/12* (2016.02); *H02J 50/40* (2016.02); *H02J 50/70* (2016.02); *H02J 50/80* (2016.02); *H02J 50/90* (2016.02)

(58) Field of Classification Search
  CPC ....... H02N 2/008; H04B 5/025–5/0093; A61B 1/0029; A61N 1/3787
  See application file for complete search history.

(56) References Cited

U.S. PATENT DOCUMENTS

| | | | |
|---|---|---|---|
| 2009/0072782 A1 | 3/2009 | Randall | 320/107 |
| 2009/0106567 A1 | 4/2009 | Baarman | 713/300 |
| 2011/0269352 A1* | 11/2011 | Vitale | H01R 13/652 |
| | | | 439/661 |
| 2012/0112552 A1* | 5/2012 | Baarman | H02J 7/025 |
| | | | 307/104 |
| 2012/0139484 A1* | 6/2012 | Gunderman | H02J 7/0044 |
| | | | 320/108 |
| 2015/0097441 A1* | 4/2015 | Jung | H02J 7/025 |
| | | | 307/104 |
| 2017/0201106 A1* | 7/2017 | Mecca | H02J 7/0044 |

\* cited by examiner

WIRELESS POWER TRANSMISSION APPARATUS INSTALLABLE ON WALL

CROSS-REFERENCE TO RELATED APPLICATIONS

This application is a national stage of International Application No. PCT/KR2014/011568, filed Nov. 28, 2014, which claims the benefit of priority to Korean Application No. 10-2013-0156720, filed Dec. 16, 2013, in the Korean Intellectual Property Office, the disclosures of which are incorporated herein by reference.

BACKGROUND OF THE INVENTION

Field of the Invention

The present invention relates to a wireless power transmission apparatus for charging an electronic device (battery) by transmitting power in a wireless scheme.

Related Art

In general, a rechargeable secondary battery is mounted in a portable electronic device such as a mobile communication terminal and Personal Digital Assistants (PDA) as a battery. In order to charge the battery, there is a need for a separate charging device for providing electric energy to a battery of a portable electronic device using residential commercial power.

Typically, since separate contact terminals are configured outside of a charging device and outside of the battery, respectively, the charging device is electrically connected to the battery by coupling the two contact terminals with each other. However, as described above, if the contact terminal protrudes an outside, an outer appearance is bad and the contact terminal is polluted from foreign materials so that a contact state is easily deteriorated. Further, if a battery is open due to carelessness of a user and the battery is exposed to humidity, a charged energy may be easily consumed.

As an alternative scheme of the contact charging scheme, there has been proposed a wireless power charging system for transferring power in a wireless scheme so that a battery is charged in such a way that a contact terminal of the charging device does not make contact with a contact terminal of the battery.

The above wireless power charging system may be placed on a desk or a table to be used. Accordingly, although a body of a wireless power transmission apparatus configuring a part of a wireless power charging system is placed on a desk or the like, the wireless power transmission apparatus should be finally connected to a socket through a wire. In spite of transmission of wireless power of the wireless power transmission apparatus, it is not clean due to the wire.

SUMMARY OF THE INVENTION

The present invention provides a wireless power transmission apparatus installable on a wall capable of configuring an aesthetical outer appearance suitable for wireless charging by omitting a wire exposed to an outside.

An embodiment of the present invention provides wireless power transmission apparatus installable on a wall, the wireless power transmission apparatus including: a housing configured to allow a wireless power reception apparatus to be placed thereon; a plug, a part of which is embedded in the housing, the plug being configured to be coupled with a socket for alternating current power installed on a wall; and a transmission unit which is embedded in the housing, converts an alternating current power supplied from the plug to a direct current power, and outputs a wireless power signal to the wireless power reception apparatus.

The housing may include a receiving groove communicating with an outside, and a rotating shaft installed in the receiving groove, and the plug comprises an electrode terminal inserted into the socket for the alternating current power and a body coupled with the electrode terminal and rotatably coupled with the rotating shaft.

The housing may include: an installation part in which the plug is installed; and a mount part which extends as being bent to form an obtuse angle with respect to an extending direction of the installation part.

A width of the installation part may have a size where the electrode terminal protrudes to an outside despite rotation of the plug.

The housing may include a mount surface on which the wireless power reception apparatus is placed, and an installation surface on which the plug is installed, and the mount surface is arranged as being inclined with respect to the installation surface.

The transmission unit may include: a transmission coil arranged in parallel with the mount surface at an inner side of the mount surface and configured to output the wireless power signal; a transmission controller located between the transmission coil and the installation surface and configured to control an operation of the transmission coil; and a shielding member located between the transmission coil and the transmission controller and configured to prevent an electromagnetic wave generated from the transmission coil from being transferred to the transmission controller.

The wireless power transmission apparatus may further include a support unit installed in the housing to support the wireless power reception apparatus.

The support unit may include: a support plate; and a bending plate extending from the support plate as being bent.

The support unit may further include an elastic member connected to the support plate to elastically pull the bending plate toward the housing.

The housing may include a mounting groove communicating with an outside, and the elastic member may be provided in the mounting groove.

The wireless power transmission apparatus may further include a wired communication port exposed to an outside through the housing, and connected to the direct current power.

The wireless power transmission apparatus may further include a reinforcing unit configured to reinforce adhesive strength between the housing and the socket, the reinforcing unit may include: a magnet installed at one of the housing and the socket; and a metal piece installed at the housing and the socket corresponding to the magnet.

The plug may include: an electrode terminal fixed and coupled with the housing and inserted into the socket for the alternating current power; and a ground terminal removably coupled with the housing and inserted into the socket for the alternating current power, wherein the housing may include an assembling part configured to removably receive the ground terminal.

The ground terminal may include a body and a locking piece protruding from the body, and the assembling part may include an assembling groove and a cover configured to cover a partial edge region in a circumference direction of the assembling groove so that the locking piece inserted into the assembling groove is caught at the cover.

The ground terminal may include a body and a locking piece protruding from the body, and the assembling part may include an assembling rail and a cover configured to cover an edge region of the assembling rail so that the locking piece is caught at the cover.

The assembling part may include an elastic member installed in the assembling rail, and the elastic member is elastically deformed and is restored to limit retreat of the locking piece when the locking piece moves along the assembling rail.

According to the wireless power transmission apparatus installable on a wall of the present invention configured as described above, an aesthetical outer appearance suitable for wireless charging can be configured by omitting a wire exposed to an outside.

DESCRIPTION OF EXEMPLARY EMBODIMENTS

Hereinafter, a wireless power transmission apparatus installable on a wall according to a preferred embodiment of the present invention will be described with reference to the accompanying drawings. Parts irrelevant to a description are omitted to clearly illustrate the present invention, and like reference numbers designate like constituent elements through the specification in different embodiments.

Figure 1:
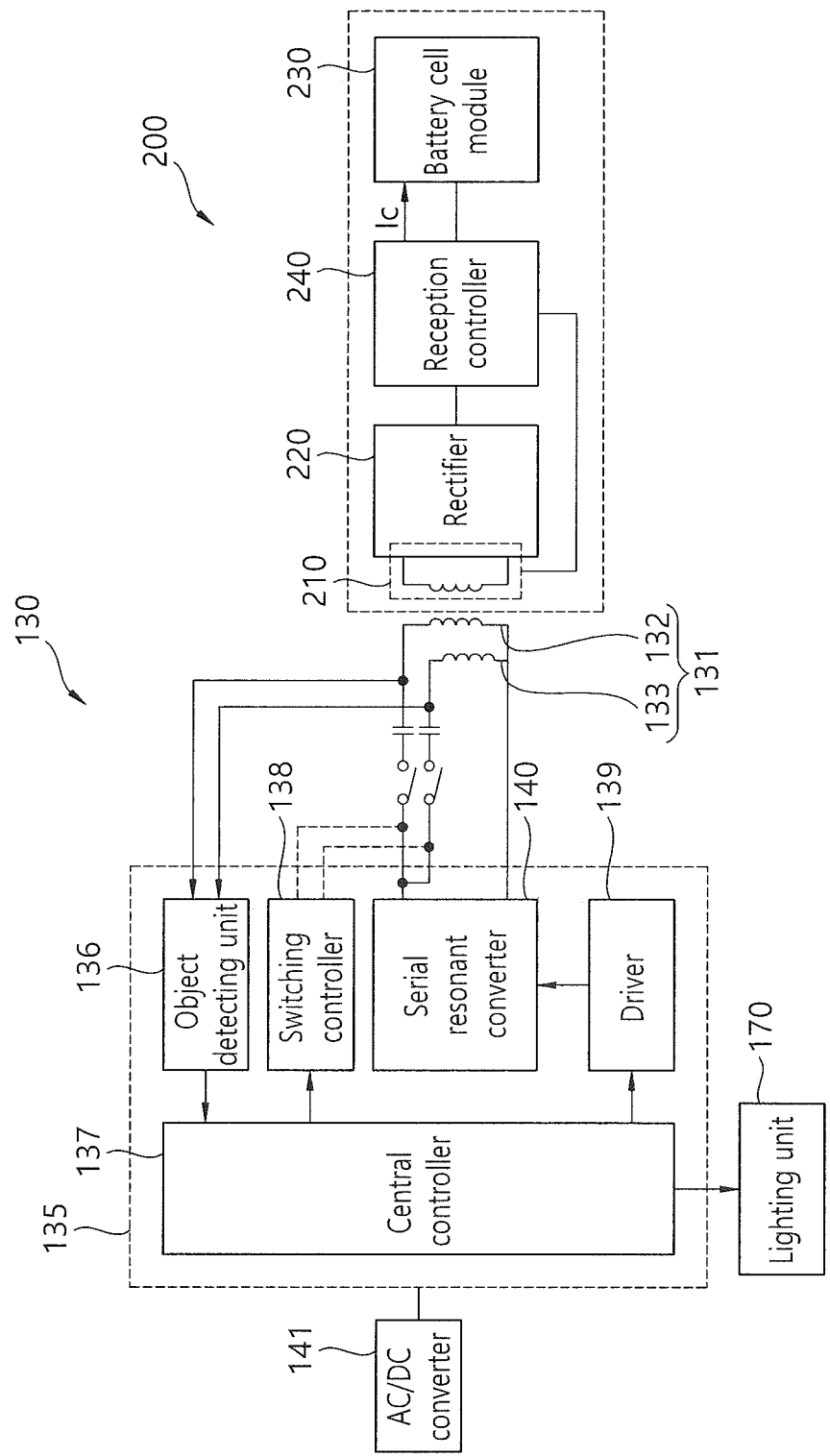
FIG. 1 is a block diagram illustrating wireless charging between a transmission unit 130 of a wireless power transmission apparatus 100 and a wireless power reception apparatus 200 according to an embodiment of the present invention.

FIG. 1 is a block diagram illustrating wireless charging between a transmission unit 130 of a wireless power transmission apparatus 100 and a wireless power reception apparatus 200 according to an embodiment of the present invention.

Figure 2:
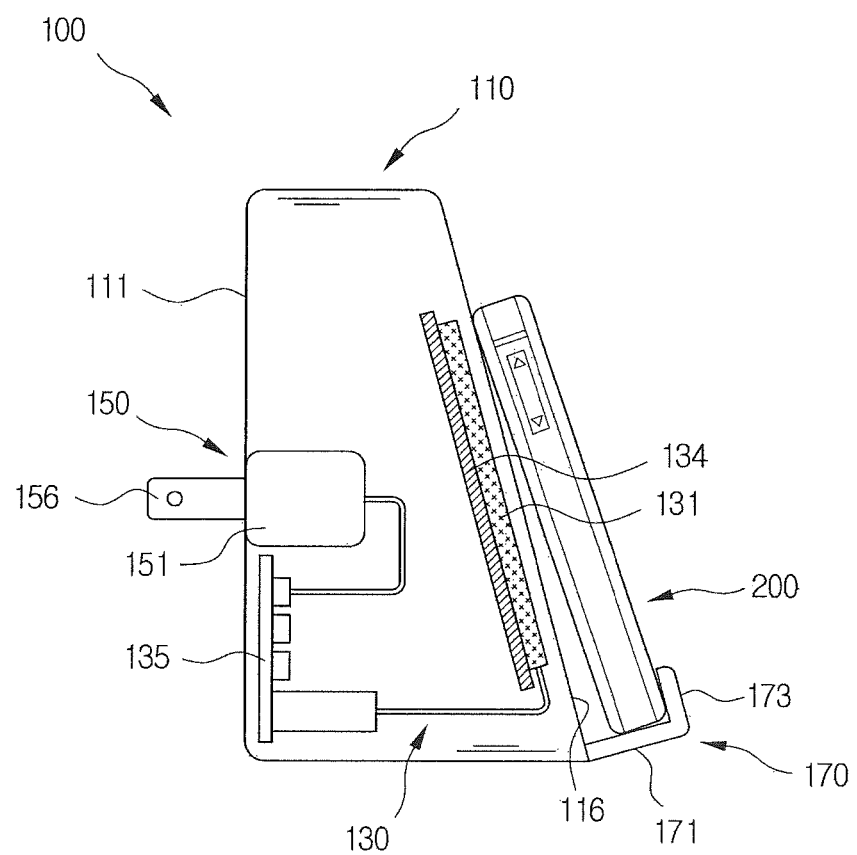
FIG. 2 is a conceptually sectional view illustrating an inner structure of the wireless power transmission apparatus 100 together with the wireless power reception apparatus 200.

Referring to FIG. 1, a wireless power charging system according to an embodiment of the present invention includes a wireless power transmission apparatus 100 of FIG. 2 and a wireless power reception apparatus 200. If the wireless power transmission apparatus 100 transmits a wireless power signal to the wireless power reception apparatus 200 in an electromagnetic induction scheme, the wireless power reception apparatus 200 receiving the wireless power signal charges a battery with power of the wireless power signal or supplies power to an electronic device connected to the wireless power reception apparatus 200.

Hereinafter, an associated configuration between the wireless power transmission apparatus 100, in detail, a transmission unit 130 and the wireless power reception 200 will be described, respectively.

The transmission unit 130 may further include a transmission coil 131, a transmission controller 135, and an AC/DC converter 141. However, when the wireless power transmission apparatus 100 uses a battery for storing a DC current of a vehicle, the AC/DC converter 141 may not be required.

First, the transmission coil 131 is a device for transmitting a wireless power signal to a reception coil 210 of the power reception apparatus 200 in an electromagnetic induction scheme. In the present embodiment, two coils, that is, a first transmission coil 132 and a second transmission coil 133 are applicable.

Next, the transmission controller 135 may include an object detecting unit 136, a central controller 137, a switching controller 138, a driver 139, and a serial resonant converter 140.

The object detecting unit 136 may detects load variation of the transmission coil 131 to determine whether corresponding load variation occurs by the wireless power reception apparatus 200. That is, the object detecting unit 136 has a function as an ID confirming unit. Further, when the transmission coil 131 includes the first transmission coil 132 and the second transmission coil 133, the object detecting unit 136 may determine a location of the reception coil 210 of the wireless power reception apparatus 200 corresponding to one of the first transmission coil 132 and the second transmission coil 133. Further, the object detecting unit 136 filters and processes a charging state signal transmitted from the wireless power reception apparatus 200. For example, if an ID signal being a response signal of an ID call signal transmitted through the transmission coil 131 is received, the object detecting unit 136 filters and processes the ID signal. If a charging state signal including information on a battery cell or charging voltage is received during charging, the object detecting unit 136 filters and processes the charging state signal.

The central controller 137 receives and confirms a determination result from the object detecting unit 136, analyzes an ID signal received by the transmission coil 131, and transmits a power signal for transmitting a wireless power signal through the transmission coil 131 to the driver 139. When the transmission coil 131 includes the first transmission coil 132 and the second transmission coil 133, the central controller 137 may control to operate one of the two transmission coils 132 and 133 close to a reception coil 210 according to the determination result of the object detecting unit 136. If the charging state signal is received from the transmission coil 131, the central controller 137 controls the driver 139 based on the received charging state signal to change the wireless power signal.

The switching controller 138 controls a switching operation of a switch between the serial resonant converter 140 and the first transmission coil 132 and the second transmission coil 133. In the present embodiment, although two transmission coils 132 and 133 are illustrated, when one transmission coil 131 is used, the switching controller 138 is not naturally required.

The driver 139 controls an operation of the serial resonant converter 140 under control of the central controller 137.

The serial resonant converter 140 generates transmission power for generating a power signal to be transmitted to provide the generated transmission power to the transmission coil 131 under control of the driver 139. In other words, if the central controller 137 transmits a power control signal for transmitting the power signal having required power to the driver 139, the driver 139 controls an operation of the serial resonant converter 140 corresponding to the transmitted power control signal, and the serial resonant converter 140 provides transmission power corresponding to the required power under the control of the driver 139 to the transmission coil 131 so that a wireless power signal having required strength is transmitted. The serial resonant converter 140 serves to supply power for generating a first object detecting signal and a second object detecting signal through the first transmission coil 132 and the second transmission coil 133 under the control of the driver 139, respectively.

The AC/DC converter 141 is a device for converting AC power of 220V or 110V into DC power of a predetermined voltage, and an output voltage of the AC/DC converter 141 is changed under control of the central controller 137.

The wireless power reception apparatus 200 for receiving a power signal to receive power includes a reception coil 210 configured to generate induction power according to the transmitted power signal, a rectifier 220 configured to rectify induced power, a battery cell module 230 charged with the rectified power, and a reception controller 240 configured to control the reception coil 210, the rectifier 220, and the battery cell module 230.

The reception coil 210 is a constituent element configured to receive a wireless power signal transmitted from the transmission coil 131 of the transmission unit 130.

The rectifier 220 rectifies the wireless power received from the reception coil 210 to a DC voltage, and maintains a charging state with a charging voltage by charging start.

The battery cell module 230 becomes a charging target through DC power in the rectifier 220 under control of the reception controller 240. Meanwhile, the battery cell module 230 includes a protective circuit such as an over voltage and over current prevention circuit and a temperature sensing circuit, and further includes a charging management module configured to collect and process information including a charging state of a battery cell.

The reception controller 240 is a constituent element configured to control a current of power charged in the rectifier 220 so that a suitable current flows to the battery cell module 230.

Meanwhile, three sensors may be installed in order to detect a wireless power reception signal transmitted from the wireless power reception apparatus 200 side. The three sensors may include a DC current sensor configured to measure a DC current of the driver 139, an AC current sensor configured to measure an AC current of the transmission coil 131, and an AC voltage sensor configured to measure an AC voltage of the transmission coil 131.

That is, if a wireless power reception signal (that is, including an ID signal and a charging state signal) from the wireless power reception apparatus 200 is received through the transmission coil 131, a current and a voltage in the transmission coil 131 and a current in the driver 139 are changed, and a wireless power reception signal is received by detecting the change in the current and the voltage in the transmission coil 131 and the current in the driver 139.

In the present embodiment, the wireless power reception signal may be more exactly received using the three sensors. That is, only when all signals from an AC current sensor, a DC current sensor, and an AC voltage sensor are an error signal, the central controller 137 generates an error signal. When at least one of all the signals is a normal signal, the central controller 137 controls an operation based on a received normal signal. If two or more signals are normal, the central controller 137 measures power levels of the normal signals, selects the best signal (a signal with the highest power level) from the normal signals, processes the best signal to acquire a wireless reception signal, resulting in controlling the transmission of wireless power.

A detailed structure of the wireless power transmission apparatus 100 will be described with reference to FIG. 2 to FIG. 5.

FIG. 2 is a conceptually sectional view illustrating an inner structure of the wireless power transmission apparatus 100 together with the wireless power reception apparatus 200.

Referring to FIG. 2, the wireless power transmission apparatus 100 includes a housing 110 and the above mentioned transmission unit 130 and a plug 150, and may further include a support unit 170.

The housing 110 receives the transmission unit 130 and a part of the plug 150. The housing 110 may have a shape where a sectional area of a bottom region is wider than a sectional area of a top part. Accordingly, a mount surface 116 may be inclined with respect to an installation surface 111 of the housing 110. In this case, the wireless power reception apparatus 200 may be mounted on the mount surface 116.

The transmission coil 131 of the transmission unit 130 is provided at a lower side of the mount surface 116. The transmission coil 131 may be inclined with respect to the installation surface 111 parallel with the mount surface 116. A shielding member 134 is located at a rear direction of the transmission coil 131 and shields an electromagnetic wave generated from the transmission coil 131 to exert influence upon the transmission controller 135. The transmission controller 135 may be provided between the transmission coil 131 and the installation surface 111. The transmission controller 135 may be connected to the transmission coil 131 through a wire in the housing 110.

The plug 150 is configured to be coupled with a socket C (see FIG. 4) and receives AC power from the socket C. The plug 150 may include a body 151 and an electrode terminal 156. In this case, the body 151 may be located in the housing 110, and the electrode terminal 156 may be located outside of the housing 110. The electrode terminal 156 may be connected to the transmission controller 135 through a wire in the housing 110 through the body 151.

The support unit 170 is installed in the housing 110 and supports the wireless power reception apparatus 200. The support unit 170 may include a support plate 171 and a bending plate 173. The support plate 171 is disposed corresponding to a side of the wireless power reception apparatus 200. The bending plate 173 extends from the support plate 171 while being bent from the support plate 171 and may be disposed corresponding to a main surface of the wireless power reception apparatus 200.

By the above configuration, the plug 150 is coupled with the socket C so that the wireless power reception apparatus 200 may be charged to be installed on a wall W while being mounted in the housing 110. Accordingly, charging is achieved between the wireless power transmission apparatus 100 and the wireless power reception apparatus 200 in a wireless scheme, and the socket C is connected to the wireless power transmission apparatus 100 through a wire so that a complicated problem is removed.

Further, the mount surface 116 is inclined with respect to the installation surface 111 so that the wireless power reception apparatus 200 mounted on the mount surface 116 may be inclined with respect to the wall W. Accordingly, the wireless power reception apparatus 200 may be close to the transmission coil 131 by gravity.

Next, a wireless power transmission apparatus according to another embodiment will be described with reference to FIG. 3.

Figure 3:
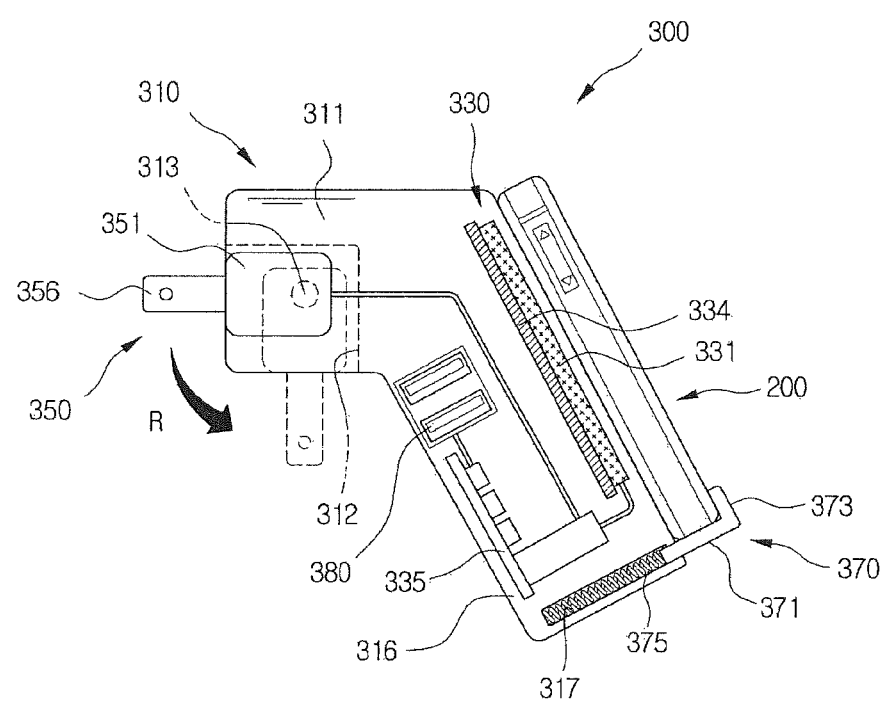
FIG. 3 is a conceptually sectional view illustrating a wireless power transmission apparatus 300 together with the wireless power reception apparatus 200 according to another embodiment of the present invention.

FIG. 3 is a conceptually sectional view illustrating a wireless power transmission apparatus 300 together with the wireless power reception apparatus 200 according to another embodiment of the present invention.

Referring to FIG. 3, an entire configuration of the wireless power transmission apparatus 300 is substantially the same as that of the wireless power transmission apparatus 100. For example, a transmission unit 330 includes a shielding member 334 located at a rear direction of a transmission coil 331 and which shields an electromagnetic wave generated from the transmission coil 331 from exerting influence upon a transmission controller 335. However, the difference of the wireless power transmission apparatus 300 from the wireless power transmission apparatus 100 is the housing 310, the support unit 370, and a wired communication port 380.

First, the housing 310 has a shape which is bent once. In detail, the housing 310 may be divided into an installation part 311 in which a plug 150 is installed and a mount part 316 in which a transmission unit 330 including a transmission coil 331 is installed and on which the wireless power reception apparatus 200 is placed. In this case, the mount part 316 extends in an extending direction of the installation part 311 while being bent with respect to the extending direction of the installation part 311. An extending direction of the mount part 316 may form an obtuse angle with the extending direction of the installation part 311.

A receiving groove 312 and a rotating shaft 313 may be formed in the installation part 311. The receiving groove 312 communicates with an outside in a side (see FIG. 4) viewed to the wall W. A body 351 of a plug 350 is received in the receiving groove 312. The rotating shaft 313 is located in the receiving groove 312 and is connected to the body 351. Accordingly, the body 351 may be rotated based on the rotating shaft 313 in the receiving groove 312. In this case, a width of the installation part 311 may be determined based on a protruding length of an electrode terminal 356 of a laid plug 350 (marked with a dotted line) to the outside.

The mount part 316 may include a mounting groove 317. The mounting groove 317 is formed in a free end side of the installation part 311 and may communicate with the outside through a placed surface of the wireless power reception apparatus 200.

The support unit 370 may include a support plate 371, a bending plate 373, and an elastic member 375. The support plate 371 is aligned to support a side of the wireless power reception apparatus 200. The bending plate 373 is bent at the support plate 371 and is aligned to cover a main surface of the wireless power reception apparatus 200. The elastic member 375 is located in the mounting groove 317 to connect a bottom of the mounting groove 317 to the support plate 371. The elastic member 375 may include a compression coil spring.

The wired communication port 380 may be exposed to an outside through a side of the side of the mount part 316 of the housing 310. The wired communication port 380 is a port directly connected to AC power which is input through a plug 350. For example, the wired communication port 380 may include a universal serial bus (USB).

By the above configuration, since the housing 310 has a shape which is bent once, the user may align the installation part 311 toward a socket C while catching the mount part 316 by a hand. In this case, since the mount part 316 and the wall W (see FIG. 4) forms an acute angle, the user easily insert the plug 350 into the socket C.

In addition, the plug 350 is rotated based on the rotating shaft 313, if the plug 350 is folded, the whole size of the wireless power transmission apparatus 300 may be reduced. Accordingly, it is easy to keep and deliver the wireless power transmission apparatus 300. When the electrode terminal 365 protrudes to an outside while folding the plug 350, it is easily to push the electrode terminal 365 by a finger during a procedure of lifting up the plug.

Finally, since the wired communication port 380 is included, when the wireless power reception apparatus 200 is put on a desk without being placed on the housing 310, a wire for charging may be inserted into the wired communication port 380.

A wireless power transmission apparatus different from the above wireless power transmission apparatus 300 will be described with reference to FIG. 4.

Figure 4:
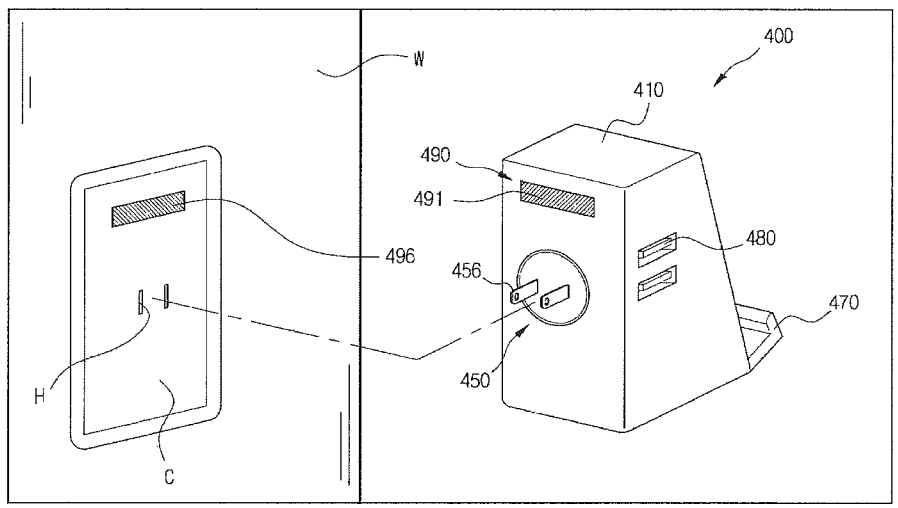
FIG. 4 is a perspective view illustrating a wireless power transmission apparatus 400 together with a socket C according to another embodiment of the present invention.

FIG. 4 is a perspective view illustrating a wireless power transmission apparatus 400 according to another embodiment of the present invention together with a socket C.

Referring to FIG. 4, an outer appearance of the wireless power transmission apparatus 400 is similar to that of the wireless power transmission apparatus 100 which was described with reference to FIG. 2. However, a wired communication port 480 of the wireless power transmission apparatus 400 is further illustrated. Moreover, a reinforcing unit 490 is further included.

The reinforcing unit 490 is configured to reinforce adhesive strength between the housing 410 and the socket C. In other words, an electrode terminal 456 of a plug 450 is inserted and coupled with a coupling hole H of the socket C, the reinforcing unit 490 reinforces the adhesive strength.

The reinforcing unit 490 may include a magnet 491 and a metal piece 496.

The magnet 491 may be located at one side of the housing 410, in detail, a surface on which the plug 450 is installed. The magnet 491 may be embedded in the housing 410 so that one side of the magnet 491 is exposed or is not exposed.

The metal piece 496 may be installed at the socket C corresponding to the magnet 491. The metal piece 496 may be attached in a simple scheme by an attaching means such as a double sided tape provided from a seller.

The above embodiment illustrates that the magnet 491 is installed in the housing 410 and the metal piece 496 is installed at the socket C. However, the metal piece 496 may be installed in the housing 410 and the magnet 491 may be installed at the socket C.

By the above configuration, coupling between the housing 410 and the socket C may be further reinforced by secondary coupling between the magnet 491 and the metal piece 496 in addition to primary coupling between the coupling hole H and the electrode terminal 456.

Accordingly, even if weights of the wireless power transmission apparatus 400 and the wireless power reception apparatus 200 are increased, the wireless power transmission apparatus 400 may be stably coupled with the socket C.

Next, a wireless power transmission apparatus according to another embodiment will be described with reference to FIG. 5.

Figure 5:
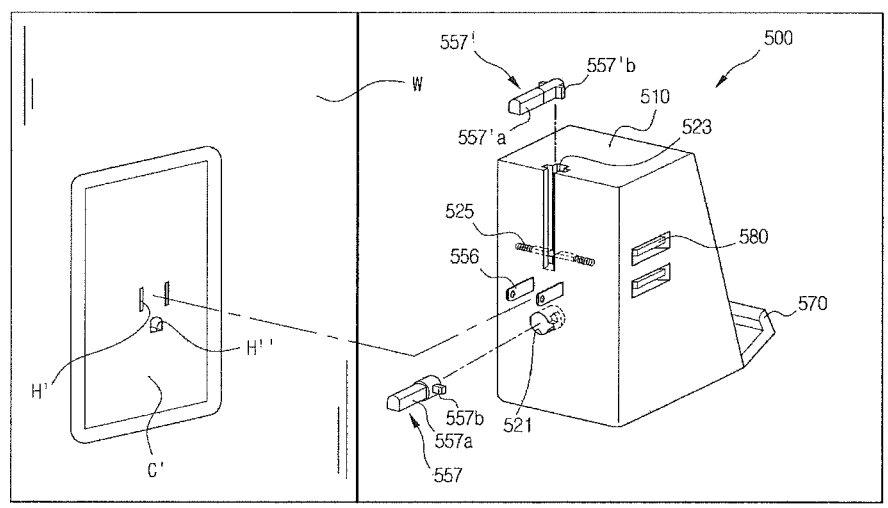
FIG. 5 is a perspective view illustrating a wireless power transmission apparatus 500 according to another embodiment of the present invention together with a socket C'.

FIG. 5 is a perspective view illustrating a wireless power transmission apparatus 500 according to another embodiment of the present invention together with a socket C'.

Referring to FIG. 5, the wireless power transmission apparatus 500 is substantially the same as the above wireless power transmission apparatus 400. For example, the wireless power transmission apparatus 500 includes a wired communication port 580 and a support unit 570 as described above. The difference is that a ground terminal 557 and a configuration associated therewith are included instead of the reinforcing unit 490. This is for the purpose of corresponding to a different type of a socket C' including a ground hole H" in addition to a coupling hole H'.

First, an assembling part is formed at a surface in which an electrode terminal 556 of a plug is coupled with the housing 510. The assembling part may include an assembling hole formed at one side of the electrode terminal 556 and an assembling rail installed at an opposite side of the electrode terminal 556. One or both of two types of the assembling hole and the assembling rail may be formed. In the former case, a pair of assembling holes or assembling rails may be included. FIG. 5 illustrates the latter case.

The plug further includes a ground terminal 557 in addition to an electrode terminal 556 corresponding to a ground hole H" and the above assembling part. The ground terminal 557 is located under or above the electrode terminal 556. In this case, since a pair of electrode terminals 556 are configured, the electrode terminal 556 and the ground terminal 557 may fully form three vertexes of a triangle.

The ground terminal 557 may include a body 557a and a locking piece 557b. The body 557a may have a bar shape. The locking piece 557b is formed at an end of the body 557a and may protrude in a radial direction of the body 557a.

The assembling part may be configured by an assembling groove 521 corresponding to the ground terminal 557. A cover for covering a partial edge region in a circumference direction thereof may be installed in the assembling groove 521. Accordingly, if the body 557 a and the locking piece 557 b are inserted into the assembling groove 521 and are then turned, the locking piece 557b is caught at the cover so that the ground terminal 557 is not separated from the housing 510.

However, the ground terminal 557 and the assembling groove 521 may be attached and separated to and from each other by screw coupling.

In addition, a ground terminal 557' according to another embodiment may include a body 557'a and a locking piece 557'b. The body 557'a has a bar shape. The locking piece 557'b protrudes to both sides of the body 557'a.

Corresponding to the above ground terminal 557', the above assembling part may be formed by an assembling rail 523. The assembling rail 523 extends near the electrode terminal 556 from an end of the housing 510. The assembling rail 523 has a cross section so that a cover covering both edges of the assembling rail 523 covers the locking piece 557'a. Accordingly, the ground terminal 557' is not vertically separated from the assembling rail 523.

Further, an elastic piece 525 may be installed in the assembling rail 523. The elastic pieces 525 are installed at both sides of the assembling rail 523 and are elastically pressed toward each other. In detail, the elastic piece 525 may include a rod, an end which of is located in the assembling rail 523 and a spring configured to press the rod toward a center line of the assembling rail 523. Accordingly, the ground terminal 557' elastically deforms the elastic piece 525 when the ground terminal 557' enters along the assembling rail 523 and does not retreat by a restored elastic piece 525.

By the above configuration, the wireless power transmission apparatus 500 may correspond to a socket C' including a ground hole H" in addition to a coupling hole H'. Furthermore, even if the ground hole H" is located above or under the coupling hole H', it may correspond thereto by changing a location of the ground terminal 557 or 557'.

The wireless power transmission apparatus installable on a wall is not limited to the configuration and an operation scheme of the embodiments. The above embodiment may be variously changed by a selective combination of all or a part of the embodiments.

What is claimed is:

1. A wireless power transmission apparatus installable on a wall, the wireless power transmission apparatus comprising:
   a housing configured to allow a wireless power reception apparatus to be placed thereon;
   a plug, a part of which is embedded in the housing, the plug including an electrode terminal coupled with the housing and configured to be inserted into a socket for alternating current power, the plug further including a ground terminal removably coupled with the housing and configured to be inserted into the socket for the alternating current power, wherein the ground terminal comprises a body and a locking piece protruding from the body,
   wherein the housing comprises an assembling part configured to removably receive the ground terminal, the assembling part including an assembling rail and a cover configured to cover an edge region of the assembling rail so that the locking piece is held in place by the cover; and
   a transmission unit, which is embedded in the housing, and configured to convert the alternating current power supplied from the plug to a direct current power, and output a wireless power signal to the wireless power reception apparatus.

2. The wireless power transmission apparatus of claim 1, wherein the housing comprises a receiving groove and a rotating shaft installed in the receiving groove, and
   wherein the plug comprises a rotating body that includes the electrode terminal, the rotating body rotatably coupled with the rotating shaft.

3. The wireless power transmission apparatus of claim 2, wherein the housing comprises:
   an installation part in which the plug is installed; and
   a mount part which extends as being bent to form an obtuse angle with respect to the installation part.

4. The wireless power transmission apparatus of claim 3, wherein a width of the installation part has a size where the electrode terminal protrudes to an outside despite rotation of the plug.

5. The wireless power transmission apparatus of claim 1, wherein the housing comprises a mount surface on which the wireless power reception apparatus is placed, and an installation surface on which the plug is installed, and
   the mount surface is arranged as being inclined with respect to the installation surface.

6. The wireless power transmission apparatus of claim 5, wherein the transmission unit comprises:
   a transmission coil arranged in parallel with the mount surface at an inner side of the mount surface and configured to output the wireless power signal;
   a transmission controller located between the transmission coil and the installation surface and configured to control an operation of the transmission coil; and
   a shielding member located between the transmission coil and the transmission controller and configured to prevent an electromagnetic wave generated from the transmission coil from being transferred to the transmission controller.

7. The wireless power transmission apparatus of claim 1, further comprising a support unit installed in the housing to support the wireless power reception apparatus.

8. The wireless power transmission apparatus of claim 7, wherein the support unit comprises:
   a support plate; and
   a bending plate extending from the support plate as being bent.

9. The wireless power transmission apparatus of claim 8, wherein the support unit further comprises an elastic member connected to the support plate to elastically pull the bending plate toward the housing.

10. The wireless power transmission apparatus of claim 9, wherein the housing comprises a mounting groove, and
    wherein the elastic member is provided in the mounting groove.

11. The wireless power transmission apparatus of claim 1, further comprising a wired communication port exposed to an outside through the housing.

12. The wireless power transmission apparatus of claim 1, further comprising a reinforcing unit configured to reinforce adhesive strength between the housing and the socket, the reinforcing unit comprises:
    a magnet installed at one of the housing and the socket; and
    a metal piece installed at the other one of the housing and the socket and located corresponding to the magnet.

13. The wireless power transmission apparatus of claim 1, wherein the assembling part comprises an elastic member installed in the assembling rail, and the elastic member is elastically deformed and restored to limit retreat of the locking piece when the locking piece moves along the assembling rail.

14. The wireless power transmission apparatus of claim 1, wherein the assembling rail and the cover together form a notch into which the ground terminal can be removably inserted such that the locking piece secures the ground terminal in the notch.

\* \* \* \* \*